United States Patent Office 3,420,262
Patented Jan. 7, 1969

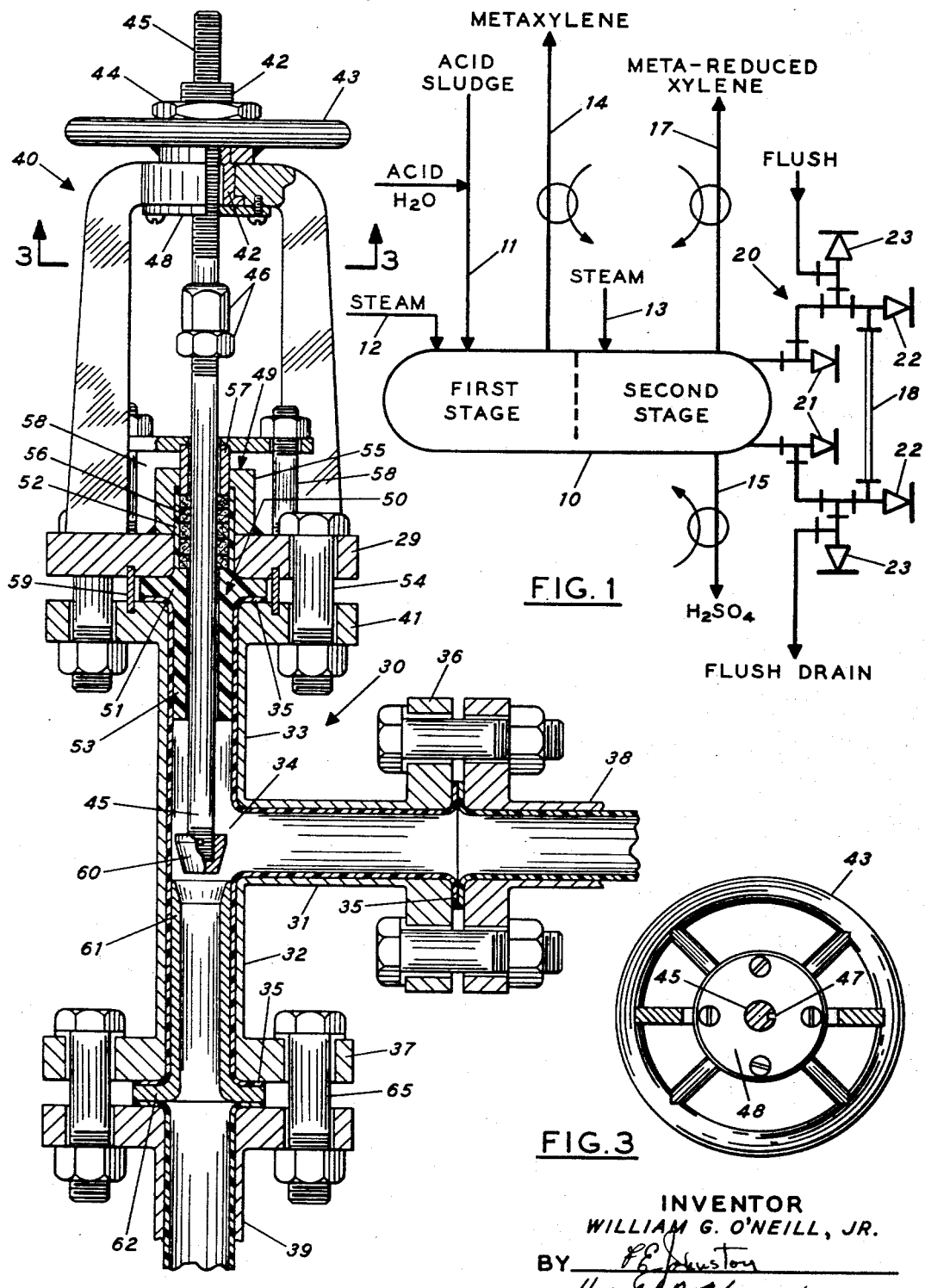

3,420,262
CORROSION-RESISTANT VALVE
William G. O'Neill, Jr., Pleasant Hill, Calif., assignor to Chevron Research Company, San Francisco, Calif., a corporation of Delaware
Continuation of application Ser. No. 538,844, Mar. 30, 1966. This application Jan. 16, 1968, Ser. No. 698,355
U.S. Cl. 137—375                                                  6 Claims
Int. Cl. F16k 27/00

ABSTRACT OF THE DISCLOSURE

A corrosion-resistant valve for use in handling corrosive fluids of high temperature and pressure and including:

(1) a flanged T valve chamber having first and second arms adapted to join sections of pipe to pass corrosive fluids through the chamber, a third arm aligned with second arm and an interior resilient protective plastic lining connected to the interior of the chamber to protect the chamber from hostile chemical action due to contact with the corrosive fluid, the lining including terminal flanges connected to the flanged ends of the arms of the chamber, (2) a yoke assembly attached to a support base and including a central opening aligned with the third arm of the valve chamber, (3) a stuffing box means attached at the third of the arms of the valve chamber and including a stuffing box liner of resilient plastic material at least partially housed in the third arm and extending through the central opening of the support base of the yoke assembly, and having (i) a central opening through which a valve stem extends, (ii) a stepped outer surface larger in size than the third arm thereby defining a circumferential protrusion positioned in contact with a terminal flange of the protective lining at the third arm of the chamber, and (iii) an interior recess adjacent to the valve stem into which is placed resilient packing means adapted to provide sealing contact with the valve stem, and (4) fastening means mounted between the support base of the yoke assembly and the flanged end of the third arm of the valve chamber adapted to apply pressure to the resilient circumferential protuberances of the stuffing box liner and the resilient terminal flange of the protective lining of the valve chamber to form a fluid-tight seal therebetween to thereby prevent leakage of said fluid from the chamber at the third arm. The protective lining of the valve chamber as well as the stuffing box liner are preferably formed of Teflon.

This application is a continuation of application Ser. No. 538,844 filed Mar. 30, 1966, and now abandoned.

This invention relates to valves rendered substantially noncorrosive by the use of materials capable of resisting chemical attack for the purpose of meeting requirements in the handling of highly corrosive acids or other chemicals tending to corrode metallic materials.

The invention has particular utility in the handling and production of meta-xylene by the selective sulfonation of the meta-xylene present in isomeric mixtures of xylene hydrocarbons.

In accordance with the present invention, a metal valve chamber, preferably in the form of a standard flanged T fitting, is provided in which the inner surface is lined with nonreactive plastic lining, such as Teflon—a registered trademark of E. I. du Pont de Nemours and Co. Within the chamber, a valve plug and a valve seat formed of highly resistant metals, such as tantalum, are provided to releasably control fluid passage through the chamber. Erosion of the seat is prevented by locating the seat in the arm of the T at right angles to the inlet arm so that the erosive velocity of the hostile chemicals is reduced prior to passage over the seat. The remaining arm of the T is attached to the flanged base of a rising stem yoke assembly; at an opposed end, the yoke assembly attaches to a handwheel and a valve stem through an exterior swivel bushing by which the stem may undergo movement relative to the chamber to releasably connect the plug to the valve seat without relative rotation between the parts. In accordance with another aspect of the present invention, the cylindrical valve seat is preferably unitarily formed; it is beveled at its near end to form an appropriate surface to receive the plug, and its more remote end is flared to form a flange which sealably attaches between the lined flanged ends of the valve chamber and the outlet piping. The outer surface of the seat is preferably placed in surface contact with the lined arm of the valve chamber to aid in preventing leakage from the chamber. In accordance with still another aspect of the present invention, the rising stem of the present valve is sealably connected to the T valve chamber by means of a stuffing box fitted with a novel stuffing box liner that extends within the valve chamber. The cylindrical liner is unitarily formed of corrosion-resistant material, such as Teflon, and includes a stepped outer surface over a mid-portion forming a protrusion which releasably and sealably connects between the lined flanged end of the valve chamber and flanged base of the yoke assembly. Above the enlarged flange exterior of the valve chamber, the liner is recessed along its interior surface to accommodate the packing of the stuffing box which sealably contacts to the stem and prevents leakage of the fluid from the valve chamber. Below the flange within the valve chamber, the remainder of the interior surfaces is placed in slidable contact with the stem to guide the plug into contact with the seat. The outer surface of the liner is also placed in surface contact with the remaining arm of the valve chamber to aid in preventing leakage of the fluids from the chamber. Safe operation of the valve is further enhanced by placing a metal circular blowout ring at the end of the enlarged flange of the stuffing box liner, as by location of the ring in circular slots in the faces of the flanges of the valve chamber and the yoke assembly.

It is an object of the present invention to provide a fluid-tight corrosion-resistant valve for use in handling erosive and corrosive fluids tending to corrode metallic materials in which there are provided cost-reducing constructional features by which the seat, plug and stuffing box packing may be renewed without complete disassembly of the valve; the valve is composed of materials capable of withstanding hostile chemical reactions interior of the valve, as well as exterior thereof, as at the flanges of the associated piping to which the valve attaches, and in which the stem is sealed relative to a stuffing box by means of multiple functioning stuffing box liner of unitary construction.

Other objects and features of the invention will become more apparent after consideration of the following description of two embodiments of the invention taken in conjunction with the following drawings, wherein:

FIGURE 1 is a schematic flow diagram of a process wherein the valve of the present invention may be employed;

FIGURE 2 is an elevational view, partially cut-away, of the valve of the present invention; and FIGURE 3 is a sectional view taken along line 3—3 of FIGURE 2.

FIGURE 1 illustrates, in flow diagram form, a process, including vessel 10, wherein a series of noncorrosive relief valves embodying the invention may be employed. In the vessel 10, a process, such as the hydrolysis of a meta-xylene sulfonic acid-sulfuric acid sludge, may be in progress. The acid sludge may be formed in previous process steps, as by the selected sulfonation of a hydrocarbon feed composed of meta-xylene and at least one other xylene isomer to a meta-xylene rich product—for example, as shown in Patent No. 2,943,121 ("Separation of Meta-Xylene From Isomeric Xylene Mixtures," J. A. Spence, issued June 28, 1960, and assigned to the assignee of the present application). In the illustrated process, the acid sludge and water enter the vessel through feed line 11. To remove the sulfo radical (—$HSO_3$) from the meta-xylene sulfonic acid sludge, water is combined with the radical to form sulfuric acid. To provide the addition of heat for the reaction, steam enters the first stage of the vessel through steam line 12 and the second stage of the vessel through steam line 13. The temperature of the first stage of the vessel is adjusted to separate the sludge into a hydrocarbon fraction rich in meta-xylene which is removed from the first stage of the vessel by outlet line 14 and a sulfuric acid layer fraction removed by bottoms line 15 in the second stage of the vessel. Steam enters through the steam inlet line 13 in the second stage to hydraulize the balance of the meta-xylene sulfonic acid-sulfuric acid sludge to provide an additional sulfuric acid layer fraction and a hydrocarbon fraction lean in meta-xylene. The hydrocarbon fraction lean in meta-xylene is removed through outlet line 17. The purity of the removed hydrocarbon rich in meta-xylene, and the strength of the sulfuric acid layer fraction (preferably 55%), are dependent upon the degree of completion of the reaction of the sludge and the water; and a measure of reaction completion is the height of the interface level of the reaction fractions formed in the second stage of the vessel. To determine the height above a norm, a glass gauge 18 is periodically connected to the vessel 10 through a valve and piping system, generally indicated at 20. In periodically checking the interface level, block valves 21 and gauge valves 22 are opened to admit the second stage reactant fractions, including the sulfuric acid fraction. As the block and gauge valves are opened, flushing valves 23 remain closed. After the interface level has been determined, the block valves are closed and the second stage reactant fractions removed from the gauge 18. Thereafter, the gauge is flushed by opening the flushing valves 23 to a source of flushing fluid (not shown). In operation, the valves 21, 22 and 23 are subject to chemical attack by the formed sulfuric acid. This invention relates to a valve construction capable of withstanding such an attack.

Referring now to the drawings, the preferred embodiment of the invention is illustrated in FIGURE 2. Its central chamber 30 is formed of a standard T pipe fitting having arms 31, 32 and 33 facing outwardly from junction 34 and lined with a noncorrosive plastic liner, such as Teflon—a registered trademark of E. I. Du Pont de Nemours and Co.—which terminates in exterior flanges 35 as shown. At the ends of the arms 31 and 32 are mounted flanges 36 and 37, respectively, for mechanically connecting the central chamber 30 to associated pipes 38 and 39.

Yoke assembly 40 is mounted by base support 29 to flange 41 of the remaining arm 33. At the upper end of the assembly 40 is located an exterior swivel bushing 42 for converting rotation of handwheel 43 to linear movement of the stem 45 into and from the chamber 30 without accompanying rotary movement of the stem. Bushing 42 is threadably attached on its exterior surface to the handwheel 43, as by nut 44, and is threadably atached on its interior surface to the upper extension of stem 45. The upper extension of the stem, which may be of ordinary steel, attaches to the lower extension of the stem, as by lock nuts 46. The lower extension is preferably of a corrosion-resistant metal, such as tantalum.

Stem 45 moves linearly as handwheel 43 is rotated, but the stem itself is prevented from following the rotation of the handwheel. As shown in FIGURE 3, key 47 of stem plate 48 is seated within a corresponding linear keyway formed along the upper extension of stem 45. Linear movement of bushing 42 is prevented both in the downward direction, as viewed in FIGURE 2, by the stem plate 48 and in the upward direction by suitable shoulders in the upper portion of the yoke assembly. As the stem moves into or from the chamber 30, leakage of hostile fluids from the valve chamber 30 is prevented by stuffing box 49 which includes cylindrical stuffing box liner 50 concentrically located about the stem 45. Stuffing box liner 50 is unitarily formed of corrosion-resistant material, such as Teflon, and includes an exterior protrusion or flange 51 over a mid-portion which separates the liner into an upper section 52 and a lower section 53, as viewed in FIGURE 2. The flange 51 is adapted to sealably attach between the base support 29 of the yoke assembly and the flange 41 of the arm 33. The radial width of the flange 51 of the liner should be at least as wide as that of the terminal flange 35 of the plastic lining of the chamber to provide a suitable seal between the parts and to insulate the flanges of the chamber from the corrosive effects from the fluids within the valve. Fastening pressure is applied to flange 51 by a series of fastening bolts 54 extending through base support 29 of the yoke assembly and flange 41 of the chamber 30.

Lower section 53 of the liner preferably has a side wall of uniform thickness. The outer surface is in tight surface contact with the plastic lining of arm 33 to aid in preventing leakage from the valve chamber; the inner surface is in slidable contact with the lower extension of the stem 45 to suitably guide the stem in movement through the chamber.

Upper section 52 of the liner is suitably accommodated within base support 29 of the yoke assembly and stuffing box housing 55 of the stuffing box 49. The inner surface is stepped, however, in this region to form a recess to suitably receive a series of packers 56 which may also be formed of a noncorrosive material, such as Teflon. The packers 56 are placed in sealable contact with the stem 45 by gland 57. As fastening bolts 58 are tightened, the gland 57 travels downward into pressure contact with the packers causing inward sealing displacement of the packers toward the portion of the stem then within the upper section 52.

Not only does the resilient contact between the flanges 41 and 51 of the plastic liner of arm 33 and of the stuffing box liner 50, respectively, insure an adequate seal between the yoke assembly and the valve chamber, but these flanges also aid in the positioning of the blowout preventer 59 at their exterior. The preventer 59 is formed of metal and is positioned within aligned slots in the support base 29 of the yoke assembly and in the flange 41 of the valve chamber 30. A seal is provided at the top and bottom of the slots. However, variation in depth of the slots above a norm is not overly critical. The resilient nature of the flanges 41 and 51 accommodates excess slot length and still provides a seal between the yoke assembly and the valve chamber.

Plug 60 screwably attaches to the lower extension of the stem 45. Although the plug is formed of corrosion-resistant material, such as tantalum, the material used to form the lower portion of the stem can be of a more conventional nature inasmuch as only the plug undergoes wearing contact within the corrosive environment of the valve chamber. The plug is beveled along its outer surface in a conventional manner to provide tapered surface for sealing contact with valve seat 61 located within arm 32 of the valve chamber.

As indicated in FIGURE 2, seat 61 is unitarily constructed and also is preferably formed of a corrosion-resistant material compatible with receiving plug 60, such as tantalum. The seat 61 includes an enlarged protrusion 62 adapted for sealable attachment between the flange 37 of the arm 32 and the flange of pipe 39. The width of the protrusion 62 should be at least as wide as that of the flange 35 of the plastic liner of arm 32 to provide suitably sealing surfaces between these parts and thereby to insulate the pipe 39 and the valve chamber from the corrosive effects of the fluids within the valve. Above protrusion 62, the diameter of the side wall of the seat remains constant. Its outer surface is preferably placed in snug fit with the plastic liner of the arm 32 to aid in preventing leakage of fluids from the valve during operations. The inner surface is of uniform diameter to facilitate passage of the corrosive fluids from pipe 38 to pipe 39 when plug 60 is released from contact with the seat 61.

Attachment of the seat between the flange 37 of arm 32 and the flange of pipe 39 is provided by a series of fastening bolts 65 similar to the fastening bolts at the other flanges of the valve chamber. These fastening bolts are easily disengaged to allow quick renewal of the seat, the stuffing box liner 50 or the packers 56, as required.

A valve in accordance with the present invention formed of the following materials and having the following dimensions has been constructed and successfully operated in an environment of meta-xylene and metal-reduced xylene and 55% by weight sulfuric acid at a temperature of 385° F. and a working pressure of 185 p.s.i.g.

Chamber 30:
    1″–300# Standard Flanged T Coupling Lined with Teflon; Flanges of Teflon Liner of Chamber 30 __Radial Width__ ½
Stem 45:
    Upper portion:
        O.D. _____inches__ ¾
        Length _____do____ 5¼
        Material _____ Steel
    Lower portion:
        O.D. _____inches__ ½
        Length _____do____ 9¼
        Material _____ Tantalum
Stuffing Box Liner 50:
    I.D. (Above Flange 51):
        O.D. _____inches__ 1
        Length _____do____ 3⅜
        Material _____ Teflon
    I.D. (Below Flange 51):
        O.D. _____inches__ 3³⁵⁄₆₄
        Length _____do____ ⅞
    Flange 51:
        O.D. _____do____ 2
        Length _____do____ ¼
Packing 56:
    Teflon rings _____do____ ¼ × ¼
Plug 60:
    Length _____do____ ⅝
    O.D. _____do____ ⅞
    Taper _____degrees__ 15
    Material _____ Tantalum
Seat 61:
    I.D. _____inches__ 11⁄16
    O.D. _____do____ 2
    Length _____do____ 3⅝
    Material _____ Tantalum
Flange 62:
    Radial width _____inches__ ½

While certain preferred embodiments of the invention have been specifically disclosed, it should be understood that the invention is not limited thereto, as many variations will be readily apparent to those skilled in the art without departing from the spirit of the invention. For example, the seat 61 can be formed of a softer, more pliable material, such as Teflon, and still provide a metal-to-plastic sealing fit to the plug 60 that resists the corrosive and erosive effects of fluids within the chamber 30.

In the use of a plastics seat, an important feature in preventing erosion of the seat between plug is the operation of external swivel bushing 42 which provides linear movement to stem 45 to seat plug 60 within the seat 61 but prevents rotation of the stem. Not only is galling between these parts prevented by the operation of the swivel bushing 42, but the number of parts within the environment of the corrosive fluids of the chamber valve is minimized. Accordingly, the invention is to be given its broadest possible interpretation within the terms of the following claims.

I claim:
1. A corrosion-resistant valve for using in handling corrosive fluid at high temperature and pressure comprising, in combination:
(a) a T-valve chamber having first and second arms at right angles to one another adapted to join sections of pipe to pass said corrosive fluid through said chamber, a third arm aligned with said second arm, and a protective lining of resilient plastic material connected to the interior of said chamber capable of withstanding hostile chemical action due to said fluid, said arms of said chamber facing outwardly from a central junction and each arm terminating in a flanged end, said lining including terminal flanges of said resilient plastic material connected to respective flanged ends of said first, second and third arms,
(b) a support base exterior of said flanged end of said third arm, said base having a central opening therethrough aligned wtih said third arm,
(c) a yoke asesmbly attached to said support base,
(d) a valve stem mounted in said yoke assembly in alignment with said second and third arms of said chamber and including an elongated portion extending into said chamber, said yoke assembly including means for reciprocally moving said stem relative to said yoke assembly and said chamber,
(e) valve plug means firmly secured to an end of said valve stem interior of said chamber so as to reciprocally move relative thereto in accordance with movement of said stem,
(f) valve seat means of corrosion-resistant material releasably secured within said second arm of said chamber, said valve seat means including a remote circumferential protrusion adapted to releasably attach to said terminal flange of said lining in contact with said flanged end of said second arm,
(g) gland means attached to said support base including means for moving said gland means with respect to said support base and said chamber,
(h) stuffing box means including a cylindrical stuffing box liner of resilient plastic material capable of withstanding corrosive action due to contact with said corrosive fluid, said stuffing box liner including a first section housed within said third arm having an outer surface in contact with said protective lining of said chamber, a second section extending from said chamber through said central opening of said support base, having an outer surface in suitable accommodation within said opening, an exterior circumferential protrusion between said first and second sections positioned in contact with a terminal flange of said lining at said flanged end of said third arm, and an interior wall means defining a central opening through which said valve stem extends,
(i) packing means mounted to said stuffing box means,
(j) said interior wall means of said stuffing box liner defining said opening being interiorly stepped along said second section to form an interior recess for said packing means, said gland means being movably connected to said packing means to compress said packing means into sealing contact with an adjacently positioned portion of said valve stem to establish a fluid-tight seal therealong and prevent leakage of said corrosive fluid from said chamber along said valve stem, and (k) fastening means mounted between said support base and said flanged end of said third arm, said fastening means adapted to apply pressure to said resilient circumferential protrusion of said stuffing box liner and said resilient terminal flange of said lining at said third arm to form a fluid-tight seal therebetween to thereby prevent leakage of said fluid from said chamber at said third arm.

2. Said valve of claim 1 in which said stuffing box liner including said resilient circumferential protrusion and said protective lining including said resilient terminal flanges at the flanged end of said arms of said chamber are formed of Teflon.

3. Said valve of claim 1 in which said valve plug is formed of tantalum and said valve seat means including said remote circumferential protrusion is formed of Teflon.

4. The valve of claim 1 in which said valve plug and valve seat means including said remote circumferential protrusion are formed of tantalum.

5. The valve of claim 3 in which said means in said yoke assembly for reciprocally moving said valve stem relative to said valve chamber includes a hand wheel and a swivel bushing means, said bushing means being operatively attached to said stem and said hand wheel to convert rotation of said hand wheel to relative movement of said stem relative to said chamber without rotation of said stem so that said tantalum valve plug is adapted to seat on said Teflon valve seat without galling.

6. Said valve of claim 1 with the addition of fastening means between said flanged end of said second arm of said chamber and a flange of a section of pipe, said additional fastening means adapted to form a fluid-tight seal between said circumferential protrusion of said valve seat means and said terminal flange of said lining at said second arm to thereby prevent leakage of said corrosive fluids therethrough.

References Cited

UNITED STATES PATENTS

| 1,258,903 | 3/1918 | Howard | 137—375 |
| 2,792,845 | 5/1957 | Atherton et al. | 137—375 |
| 3,257,095 | 6/1966 | Siver | 251—214 |

FOREIGN PATENTS 262,594  12/1926  Great Britain.

HENRY T. KLINKSIEK, *Primary Examiner.*

U.S. Cl. X.R.

251—214